United States Patent
Ohanian

[19]

[11] Patent Number: 6,161,115
[45] Date of Patent: Dec. 12, 2000

[54] MEDIA EDITING SYSTEM WITH IMPROVED EFFECT MANAGEMENT

[75] Inventor: Thomas A. Ohanian, Cranston, R.I.

[73] Assignee: Avid Technology, Inc., Tewksbury, Mass.

[21] Appl. No.: 08/631,323

[22] Filed: Apr. 12, 1996

[51] Int. Cl.[7] ............................. G06F 17/30; G06F 15/00
[52] U.S. Cl. ............................................ 707/530; 707/511
[58] Field of Search ..................................... 707/530, 526, 707/511, 516, 500; 345/326, 328, 115, 121, 302, 117, 433, 418

[56] References Cited

U.S. PATENT DOCUMENTS

| | | | |
|---|---|---|---|
| 5,339,393 | 8/1994 | Duffy et al. | 395/161 |
| 5,767,846 | 6/1998 | Nakamura et al. | 345/302 |
| 5,781,188 | 7/1998 | Amiot et al. | 345/328 |
| 5,907,837 | 5/1999 | Ferrel et al. | 707/3 |
| 6,005,560 | 12/1999 | Gill et al. | 345/302 |

*Primary Examiner*—Joseph H. Feild
*Assistant Examiner*—Alford W. Kindred
*Attorney, Agent, or Firm*—Kristofer E. Elbing

[57] ABSTRACT

A media editing system that includes storage for a machine-readable composition made up of scenes separated by transitions. The system can identify to an effect generator a scene in the composition and receive a modified version back from the effect generator. It can read machine-readable information associated with the modified version, and automatically reinsert the modified version into the machine-readable composition in synchronism with the position in the composition that the scene occupied, based on the machine-readable information. The system can also associate versions of the scene with the scene and display to a user a list of identifiers of the versions in response to user command that references a portion of a timeline, and respond to a selection command from the user to select one of the versions to be a default version for the composition.

16 Claims, 4 Drawing Sheets

MEDIA EDITING SYSTEM WITH IMPROVED EFFECT MANAGEMENT

FIELD OF THE INVENTION

This invention relates to media editing systems, and more particularly to non-linear, computer-based motion picture editing systems.

BACKGROUND OF THE INVENTION

It is known to use non-linear, computer-based editing systems to edit motion picture media such as digitized video or film. Generally, motion picture media is first digitized and stored on the system as source media. The editor then uses the editing system, which can employ a timeline metaphor, to develop a composition made up of clips from the source media. These types of editing systems have greatly increased the efficiency of the editing process, and have allowed editors to concentrate on the creative rather than mechanical aspects of editing.

SUMMARY OF THE INVENTION

In one general aspect, the invention features a media editing system that includes storage for a machine-readable composition made up of scenes separated by transitions. The system can identify to an effect generator a scene in the composition and receive a modified version back from the effect generator. It can also read machine-readable information associated with the modified version, and automatically reinsert the modified version into the machine-readable composition in synchronism with the position in the composition that the scene occupied, based on the machine-readable information.

In preferred embodiments, the system can find a match between the modified version and the scene in the machine-readable composition, and it can receive the modified version from a network, such as a digital, packet-based, inter-city network. The system can also visually prompt the user before enabling automatic reinsertion, and the user can activate and deactivate this prompting. The system can receive, read, and reinsert a modified version into the machine-readable composition independent of user input, even while other portions of the editing system are responsive to user input. They system can also automatically pad the modified version if it does not fully overlap the scene in the machine-readable composition. The system further includes version management for associating the modified version with other alternate versions.

According to another general aspect, the invention features a media editing system that includes storage for storing versions of a motion picture scene in a machine-readable composition. It can associate the versions of the scene with the scene and display to a user a list of identifiers of the versions in response to user command that references a portion of a timeline. The position of this portion of the timeline corresponds to the position of the scene in the composition. The system can also respond to a selection command from the user to select one of the versions to be a default version for the composition.

In preferred embodiments, the system can display the list at a position that is adjacent the portion of the timeline that corresponds to the position of the scene in the timeline. The system can respond to actuation by the user, such as by a pointing device cursor, of an area whose position is associated with one of the identifiers in the list to select a version to be a default version for the composition.

According to a further general aspect, the invention features a media editing method that includes displaying a timeline for a composition, electronically storing a representation of alternate versions of a motion picture scene for which the composition is displayed, and associating the representation of the versions of the scene with the scene. The method also includes displaying to a user a list of identifiers of the versions of the scene in response to user actuation, such as by a pointing device cursor, of a portion of the timeline corresponding to the scene for which the composition is displayed.

Systems according to the invention can be advantageous in that they assist the user in tracking and organizing alternate versions of a scene. This benefit can be particularly important where multiple people are working on the same material, or where scenes are sent to remote locations for effect generation and rendering. By helping the user to track and manage versions of a scene, the user is freed up to focus more of his or her efforts on creative aspect of the editing task. By providing for reconciliation of modified scenes without any user prompting, the user may also experience fewer interruptions in his or her work. Furthermore, aspects of the invention provide for a meaningful interface, which clearly and conveniently conveys information to the user about the alternate scenes available for a particular scene on a particular track.

DETAILED DESCRIPTION

Figure 1:
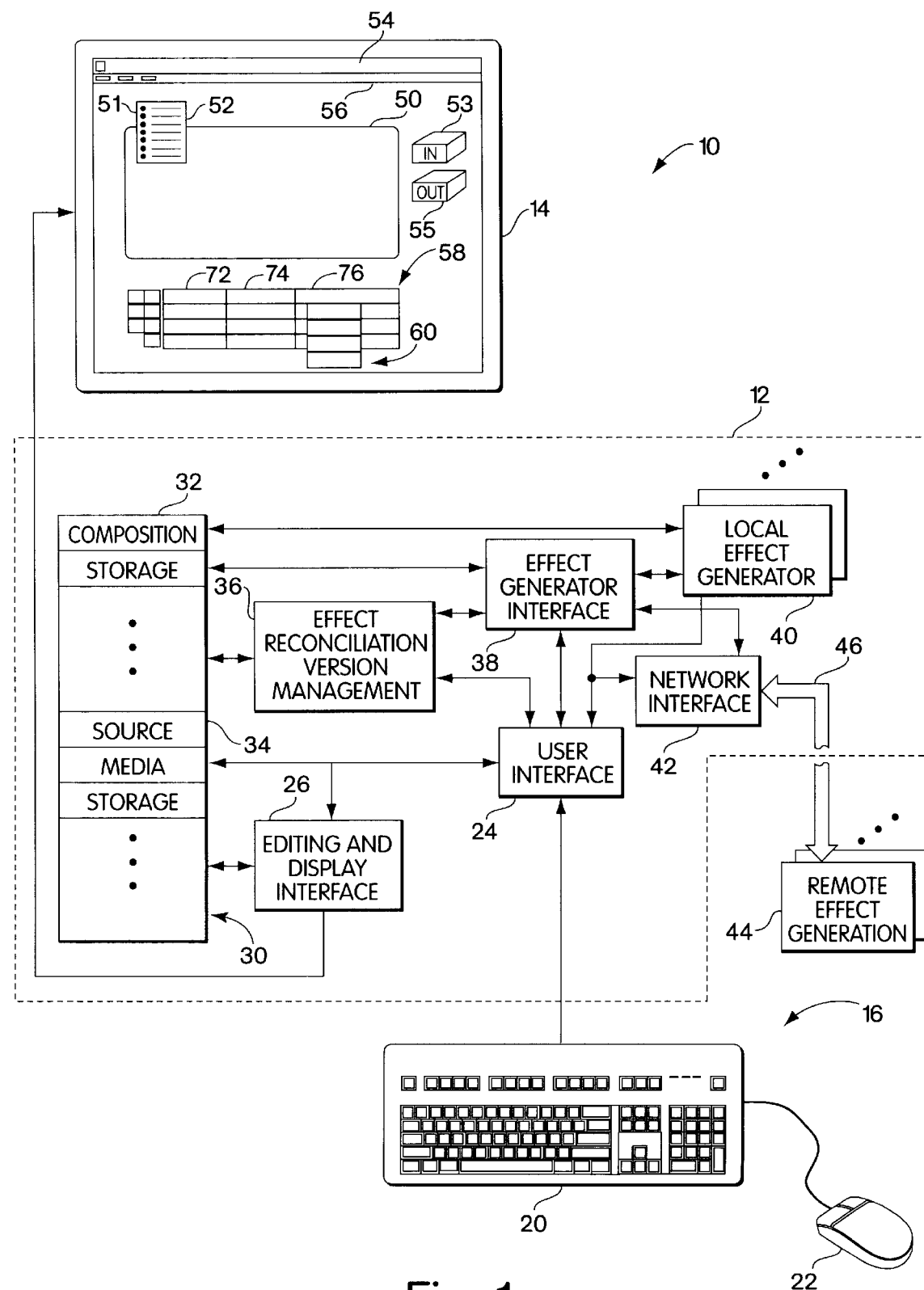
FIG. 1 is a block diagram of a media editing system employing effect management according to one aspect of the invention.

Referring to FIG. 1, an illustrative media editing system 10 can include a media editing processing system 12, a display 14, and a user input device or devices 16. The user input devices may include a keyboard 20, a pointing device such as a mouse 22, and/or a special-purpose editing control (not shown). The display can be a cathode ray tube display (CRT) or liquid crystal display (LCD), or any other display device suitable for the media being edited.

The composition editing processing system 12 includes a user interface module 24 responsive to the user input devices 16. This user interface communicates with an editing and display interface 26, which can in turn communicate with storage 30 and the display 14. The user interface includes drivers to interpret signals from the user input devices and includes facilities to provide visible controls to the user in the form of menus, icons, and the like. The editing and display interface responds to user input obtained through the user interface to assemble source media elements stored in source media storage 34 into a composition in composition storage 32. The editing of digitally stored media elements to form compositions which are to be displayed on a display is generally known, and will not be discussed further here.

The media editing processing system 12 further includes an effect reconciliation module 36, an effect generator interface 38, one or more local effect generators 40, and a network interface 42, which are each also in communication with the user interface. The effect reconciliation module, effect generator interface, and local effect generator can each communicate with the storage 30, and the network interface 42 is operatively connected to a network 46. The network 46 can be a local area network (LAN), a wide area network (WAN), or any other network over which media data can be effectively conveyed. The effect generator interface communicates with the effect reconciliation module, the local effect generator, and the network interface.

Figure 2:
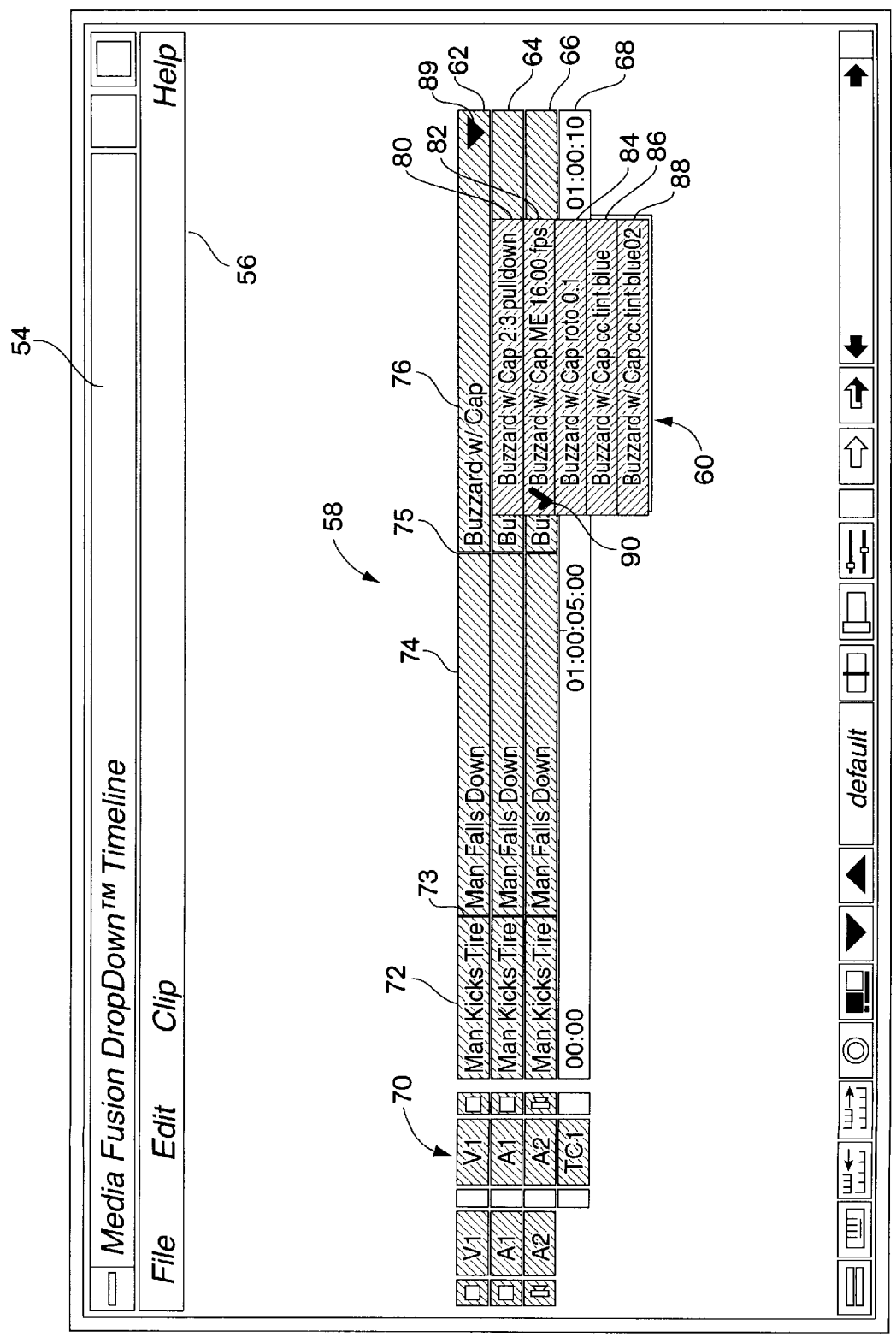
FIG. 2 is a view of the display of the media editing system of FIG. 2 showing its timeline and an alternate modified scene list for a scene presented in that timeline.

Referring to FIGS. 1 and 2, the user interface 24 of the media editing system 10 provides various controls to be displayed on the display 14 by the editing and display interface 26. These controls include an effect palate 52 including effect icons 51, a title bar 54, and a menu bar 56. Also included are a media display window 50 and a timeline 58. The timeline 58 can include a plurality of media tracks, such as a video track 62, a left audio track 64, and a right audio track 66. A variety of other types of tracks such as a time code track 68, an edge code track (not shown), or a subtitle track (not shown) can also be provided.

The timeline represents a composition of a series of scenes 72, 74, 76 separated by transitions 73, 75. Each of the scenes is represented as a rectangular area bearing a title of the scene, and the transitions are represented by the lines or other shapes that lie between the scenes. Track identifiers 70 are provided to the left of the timeline to identify the different tracks. In one example, the timeline includes a first scene 72 entitled "Man kicks tire," which is separated from a second scene 74 by a first transition 73. The second scene is entitled "Man falls down," and is separated from the third scene 76 by a second transition 75. The third scene is entitled "Buzzard w/cap."

The user interface 24 is configured to allow the user to expand the timeline entry for each scene in each track, although it is contemplated that systems could be constructed that only allow scenes in some of the tracks (e.g., only the video track) to be expanded. This expanded timeline area 60 is made up of one or more additional alternative scene entry areas 80, 82, 84, 86, and 88. When the video track of the third illustrative scene 76 is expanded it exhibits the names of five alternate scenes in an alternate scene display area 60. The first alternate scene 80 is entitled "Buzzard w/cap 2:3 pulldown," the second alternate scene 82 is entitled "Buzzard w/cap ME 16.00 fps," and the third alternate scene 84 is entitled "Buzzard w/cap roto zero one." The fourth alternate scene 86 is entitled "Buzzard w/cap cc tint blue," and the fifth alternate scene 88 is entitled "Buzzard w/cap cc tint blue02". As will be discussed in more detail below, each of these alternate scene designators represents a different version of the video track of the third scene 76. The first alternate scene is a 2:3 pulldown version of the third scene, the second alternate scene is a 16 frame per second motion effect version of the third scene, the third alternate scene is a "rotoscoped" version of the third scene (i.e., a version that is combined with another scene), the fourth alternate scene 86 is a blue tint version of the third scene, and the fifth alternate scene is a different blue tint version of the third scene. Preferably, the effects for these modified scenes are rendered, if the system is not capable of rendering them in real time. The displayed track area of the third scene 76, which has alternate scenes associated with it, has an alternate scene indicator 89 to indicate to the user that the alternate scenes exist. This indicator can be a downward-pointing triangle.

Figure 3:
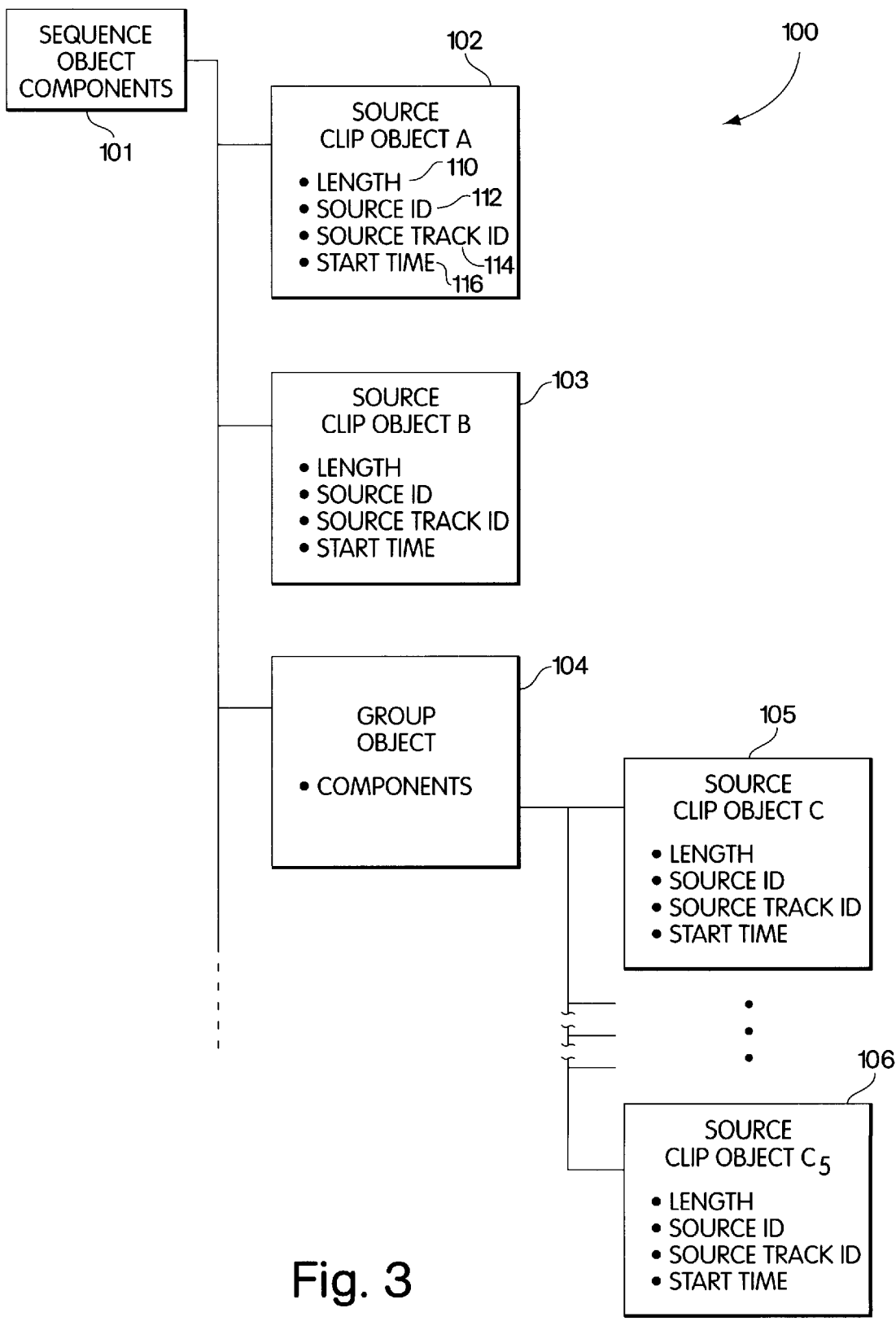
FIG. 3 is a data model diagram for use by the system of FIG. 1 to store an illustrative composition presented on the timeline of FIG. 2.
Figure 4:
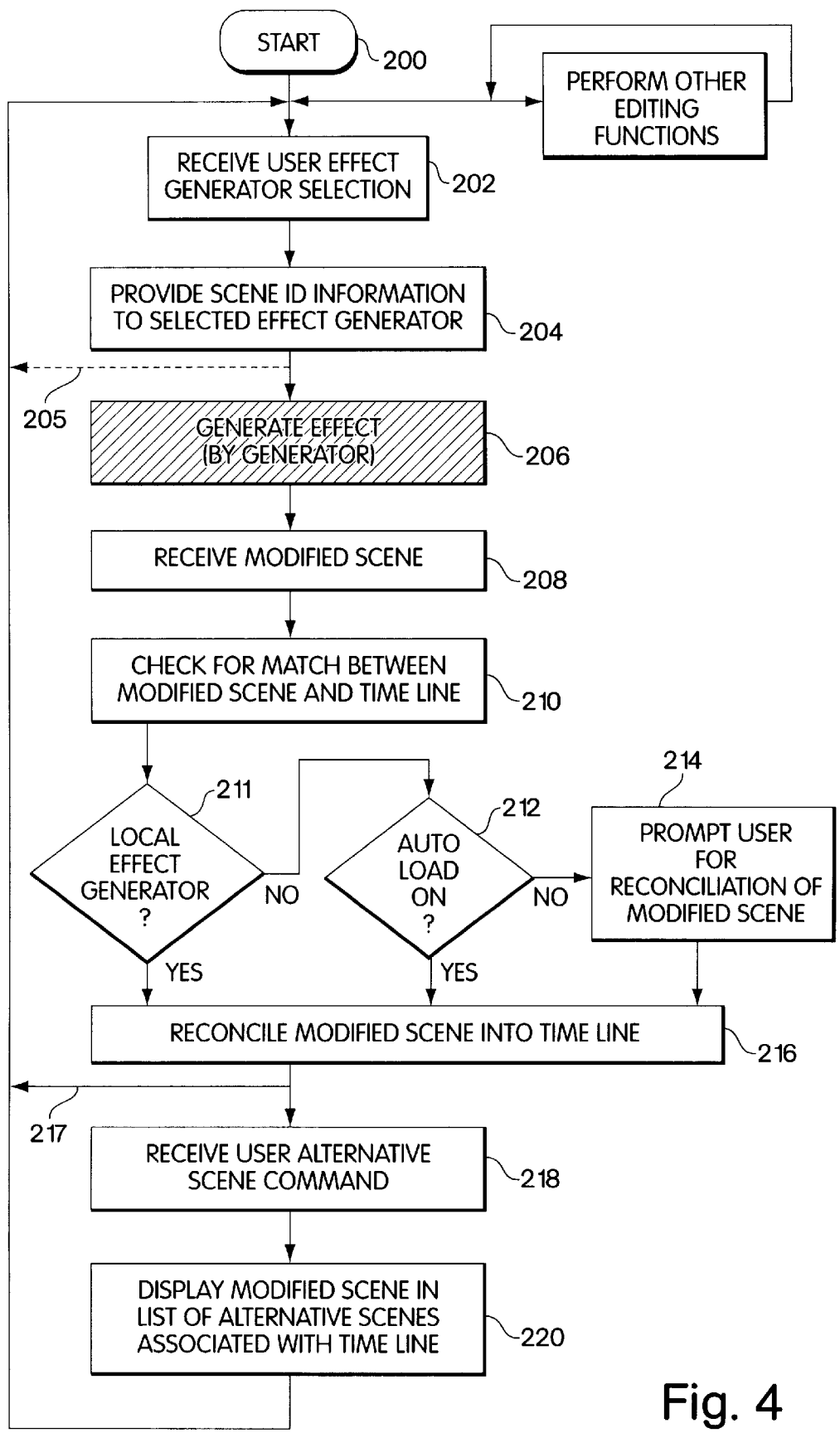
FIG. 4 is a flowchart illustrating operation of the system of FIG. 1.

Referring to FIGS. 1–3, the media editing system 10 can store compositions using an object oriented data model 100. This model includes a sequence object 101 for each track. Each sequence object is made up of an ordered series that can include source clip objects 102, 103, 105, 106, group objects 104, and/or transition objects (not shown). Each source clip object includes a length parameter 110, a source identifier 112, a source track identifier 114, and a start time 116. A clip object's source identifier and track identifier identify the source in the media storage 34 of the scene corresponding to that object. For example, it can identify a clip from digitized film footage stored in the media storage. The length and start time specify how much of the clip is to be used for the scene, and where the scene is to begin within the source clip.

Where there are no alternate scenes, the first scene 72 can be represented by a first clip object 102, and the second scene 74 can be represented by a second clip object 103. No transition effect need be specified if the user only wants a simple cut between scenes. Where the third scene 76 has several alternatives, it can be represented by a group object 104. This group object has a component identifier which identifies further clip objects 105, 106. One of skill in the art would be able to devise somewhat different data structures for keeping track of alternative versions within a timeline. The widely used Open Media Framework Interchange format (OMFI), which is available from Avid Technology, Inc. of Tewksbury, Mass. can be used to store compositions that include alternate scenes. Version 2.0 of this standard is herein incorporated by reference.

The media editing processing system 12 can include dedicated special purpose circuitry, and/or general purpose processing circuitry running special purpose software. It is also noted that the breakdown of elements can be different from that shown in FIG. 1 without altering the essential overall functioning of the system. In one embodiment, the editing system operates on a high performance, 4-processor work station such as the "Onyx" or "Indigo II Impact" workstations available from Silicon Graphics, Inc. of Mountain View, Calif. This workstation employs the well-known Unix operating system, which provides networking capabilities to the editing system.

In operation, referring to FIGS. 1–4, once the user has a timeline representing a composition displayed on the display, and he or she is ready to add effects to scenes in the composition (step 200), the user can select an effect (step 202). To select an effect, the user can drag one of the effect icons 51 from the effect palate 52 onto one track of one of the scenes 72, 74, 76 on the timeline 58. Alternatively, the user can drag the scene for the track to the out box 55, after which he or she will be prompted for an outgoing network address. Note that in one embodiment, the system can distinguish between selecting an effect in a manner that it will result in the creation of an alternative scene or selecting the effect in a manner that will result in replacement of the scene, by responding to different types of effect selection (e.g., shift or shift-option clicking).

When the user selects an effect using the effect palate 52, the effect generator interface 38 provides identifying information for the selected scene to one of the local effect generators 40 (step 204). The user can then use the local effect generator to generate the effect (step 206). Examples of effects include color corrections, masks, motion effects, frame painting, flips, flops, resizing, among others.

When the user selects an effect via the out box 55, scene identifying information, and optionally the source media for the scene, are provided via the network 46 to a remote effect generation location 44 by the network interface 42. The effect is then generated at the remote location, which can be in the next room or in another city (step 206). The effect may be devised and rendered at the remote location by a skilled editor. When he or she is done generating the effect, he or she returns the resulting modified scene via the network to the network interface 42. Note that remote effect generation may take time, and that the user may chose to continue to perform other editing tasks in the interim (branch 205).

When the effect generator interface 38 receives the modified scene from either the local effect generator 40 or the network interface 42, it checks for a match between the modified scene and the timeline (step 210). This may be done by comparing the source identifier 112, the source track identifier 114, and the start time 116 of the modified scene with similar identifying information for scenes in the timeline, and determining whether there is a scene in the timeline that matches the modified scene, at least to the extent that there is some overlap. If no match is discovered, the modified scene can remain in a holding bin, or in the in box 53. If the match is only partial, the effect generator interface can automatically create a "padded" modified scene that fits within the slot for the third scene 76, but includes some blank fill or fill from the unmodified scene.

If the matching modified scene was obtained from a remote effect generator 44, ("no" branch of step 211) and the media composing system is not in autoload mode ("no" branch of step 212), the media editing system 10 prompts the user about whether he or she would like to reconcile the modified scene into the timeline (step 214). If the modified scene is from a local effect generator or autoload mode is on ("yes" branches of steps 211 or 212), reconciliation (step 216) begins without user prompting. If the user declines to reconcile modified scene, it can remain as an icon in the in box 53. Note that both the in box and the out box 55 can be displayed in a list format, similar to the one used for the effects palate, and in this format the boxes can list incoming and outgoing scenes and information about them.

To reconcile a modified scene, the effect reconciliation module 36 automatically adds a new modified source clip object (e.g., 106) to the linked list of source clip components belonging to the media group object 104 in the data structure for the track that includes the unmodified scene. The effect reconciliation module 36 includes version management facilities that update the data structure to include the new modified source clip object automatically, without user intervention. Note that the auto-relinking performed by the effect reconciliation module can take place while the user is performing other editing tasks. This feature is particularly useful with remotely generated effects, and it can be implemented by running a separate task for the effect reconciliation.

Once the modified scene has been reconciled into the timeline (step 216), the user can look at the alternate scenes (steps 218, 220), or he or she can select another effect or perform other editing functions (branch 217). If the user chooses to browse through the alternative scenes, he or she can click on the desired track of the scene (or double-click, or otherwise actuate the desired track, its alternate indicator triangle, or another area associated with the track for that scene) (step 218). In response, the user interface presents him or her with the alternative scene display area 60 (step 220), which presents the user with a listing of alternate treatments of the scene (a "treatment collection"). This area can remain open only so long as the button of the mouse 22 is held down (a "drag" operation), or it can stay open until a second click of the mouse (a "toggle" operation), although other behaviors are also possible. With the area open, the user can use the mouse or otherwise select one of the alternative scenes 80, 82, 84, 86, 88 to be used as the default scene in the timeline. The selected default scene is indicated by a default icon 90. Once a default scene has been selected, the default scene will be presented when the composition represented by the timeline is played, stepped through, or otherwise viewed, or when an edit decision list (EDL) is generated. Normally, the most recently added version of a scene becomes the default version, but the user can manually select an earlier one.

The automatic management of scene versions and intuitive interface can significantly enhance productivity, particularly in large projects or projects involving significant numbers of effects. An editor can work on a large composition that includes many scenes that will each require different effects, while effects specialists work on the effects themselves. The effects specialists can then add modified versions of the scene to the editor's timeline, without requiring him or her to track which scenes have been updated, and even without any interruption in the editor's work. And if the scenes are sent over a network, the editor can chose particularly well-suited effects specialists for the different scenes from a variety of remote locations. If a scene requires a succession of sophisticated effects, the editor can begin working with the base scene (e.g., a stop-frame animated model), then work with intermediate versions (e.g., a wire frame outline based on the model), and finish with a final version (e.g., ray-traced computer graphics based on the wire frame outline). In working on the project, the editor has the sense that the project is moving along, but is not caught up in the tedium of manually tracking the various effects.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. A media editing system, comprising:

storage for storing a machine-readable composition made up of a plurality of media objects located at a plurality of positions in the composition, means for receiving a modified version of one of the media objects in the composition from a remote location and a machine-readable identifier associated with the modified version of the one of the media objects, effect reconciliation means responsive to the means for receiving, for reading the machine-readable identifier and for finding a match between the modified version of the one of the media objects and the one of the media objects in the composition based on the machine-readable identifier and an identifier corresponding to the one of the media objects, means for automatically inserting the modified version of the one of the media objects into the machine-readable composition in synchronism with one of the positions in the composition that the one of the media objects occupied in the composition, and a version selection control responsive to a selection command from the user to access both the one of the media objects and the modified version of the one of the media objects after automatic insertion of the modified version by the means for automatically inserting.

2. The media editing system of claim 1 further including means responsive to the storage and to user input for identifying to the remote location the one of the media objects in the composition stored in the storage.

3. The media editing system of claim 1 wherein the means for receiving a modified version is operatively connected to a network and wherein the means for receiving a modified version are operative to receive the modified version through the network.

4. The media editing system of claim 1 wherein the means for receiving a modified version is operatively connected to a digital, packet-based, inter-city network and wherein the means for receiving a modified version are operative to receive the modified version through the network.

5. The media editing system of claim 1 wherein the means for receiving includes prompting means for visually prompting and responding to the user before enabling the means for automatically inserting to insert the modified version of the one of the media objects in the machine readable composition.

6. The media editing system of claim 1 wherein the means for automatically inserting includes means for finding a match between the modified version of the one of the media objects and the one of the media objects in the machine-readable composition, and means for automatically padding the modified version of the one of the media objects if the modified version of the one of the media objects does not fully overlap the one of the media objects in the machine-readable composition.

7. The media editing system of claim 1 wherein the means for automatically inserting includes version management means for associating the modified version of the one of the media objects with other alternate versions of the one of the media objects in the machine-readable composition.

8. The media editing system of claim 1 wherein the one of the media objects is one of a plurality of motion picture scenes located at a plurality of positions in the composition, and wherein the scenes are separated by transitions in the composition.

9. The media editing system of claim 1 wherein the automatic insertion module includes a version management module, and wherein the version management module is operative to associate the modified version of the one of the media objects with other alternate versions of the one of the media objects in the machine-readable composition.

10. A media editing system, comprising:

storage for storing a machine-readable composition made up of a plurality of media objects located at a plurality of positions in the composition, means for receiving a modified version of one of the media objects in the composition from a remote location and a machine-readable identifier associated with the modified version of the one of the media objects, wherein the means for receiving includes prompting means for visually prompting and responding to the user before enabling the means for automatically inserting to insert the modified version of the one of the media objects in the machine-readable composition, and wherein the prompting means include user-activated mode selection means responsive to a user command for activating and deactivating the prompting means, reconciliation means responsive to the means for receiving, for reading the machine-readable identifier and for finding a match between the modified version of the one of the media objects and the one of the media objects in the composition based on the machine-readable identifier and an identifier corresponding to the one of the media objects, and means for automatically inserting the modified version of the one of the media objects into the machine-readable composition in synchronism with one of the positions in the composition that the one of the media objects occupied in the composition.

11. A media editing system, comprising:

storage for storing a machine-readable composition made up of a plurality of media objects located at a plurality of positions in the composition, means for receiving a modified version of one of the media objects in the composition from a remote location and a machine-readable identifier associated with the modified version of the one of the media objects, wherein the means for receiving, the reconciliation means, and the means for automatically inserting are operable to receive, read, and insert a modified version of the one of the objects into the machine-readable composition independent of user inputs, reconciliation means responsive to the means for receiving, for reading the machine-readable identifier and for finding a match between the modified version of the one of the media objects and the one of the media objects in the composition based on the machine-readable identifier and an identifier corresponding to the one of the media objects, and means for automatically inserting the modified version of the one of the media objects into the machine-readable composition in synchronism with one of the positions in the composition that the one of the media objects occupied in the composition.

12. The media editing system of claim 11 wherein the means for receiving, the reconciliation means, and the means for automatically inserting are operable to receive, read, and insert a modified version of the one of the media objects into a composition while other portions of the editing system are responsive to user input.

13. A media editing system, comprising:

storage for storing a machine-readable composition made up of a plurality of media objects located at a plurality of positions in the composition, means for receiving a modified version of one of the media objects in the composition from a remote location and a machine-readable identifier associated with the modified version of the one of the media objects, reconciliation means responsive to the means for receiving, for reading the machine-readable identifier and for finding a match between the modified version of the one of the media objects and the one of the media objects in the composition based on the machine-readable identifier and an identifier corresponding to the one of the media objects, means for automatically inserting the modified version of the one of the media objects into the machine-readable composition in synchronism with one of the positions in the composition that the one of the media objects occupied in the composition, wherein the means for automatically inserting includes version management means for associating the modified version of the one of the media objects with other alternate versions of the one of the media objects in the machine-readable composition, and alternate media object display means for displaying user-readable identifiers of the alternate versions of the one of the media objects in the machine-readable composition, including the modified version of the one of the media objects.

14. The media editing system of claim 13 wherein the alternate media object display means are operative to display the identifiers to the user in a display area that is adjacent to a timeline that displays information about the composition.

15. The media editing system of claim 13 wherein the alternate media object display means are responsive to user actuation of a portion of a timeline that displays information about the composition on a display that is responsive to the media editing system, and wherein the portion of the timeline is at a position in the timeline that corresponds to the one of the positions in the composition that the one of the media objects in the machine-readable composition occupies.

16. The media editing system of claim 15 wherein the alternate media object display means are operative to display the identifiers to the user in a display area that is adjacent to the portion of the timeline.

* * * * *